US012442394B2

(12) United States Patent
Tilmos et al.

(10) Patent No.: US 12,442,394 B2
(45) **Date of Patent: *Oct. 14, 2025**

(54) VALVE MANIFOLD, VALVE AND ACTUATOR ASSEMBLY

(71) Applicant: Asco, L.P., Novi, MI (US)

(72) Inventors: Wayne Tilmos, Novi, MI (US); Gary Zahn, Highland, MI (US)

(73) Assignee: Asco, L.P., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,710

(22) Filed: May 14, 2024

(65) Prior Publication Data

US 2024/0295228 A1 Sep. 5, 2024

Related U.S. Application Data

(62) Division of application No. 17/770,497, filed as application No. PCT/US2019/057667 on Oct. 23, 2019, now Pat. No. 12,055,161.

(51) Int. Cl.
*F15B 11/12* (2006.01)
*F15B 15/14* (2006.01)
*F15B 15/20* (2006.01)

(52) U.S. Cl.
CPC ........ *F15B 11/123* (2013.01); *F15B 15/1409* (2013.01); *F15B 15/202* (2013.01); *F15B 2211/8855* (2013.01)

(58) Field of Classification Search
CPC .. F15B 11/123; F15B 15/1409; F15B 15/149; F15B 15/202
See application file for complete search history.

(56) References Cited

U.S. PATENT DOCUMENTS 2,485,805 A 10/1949 Bent
3,149,537 A 9/1964 Fink
(Continued)

FOREIGN PATENT DOCUMENTS

CN 102658768 A 9/2012
CN 106415094 A 2/2017
(Continued)

OTHER PUBLICATIONS

Extended European Search Report, Application No. 19949889.0-1012, Applicant: Asco, L.P.
(Continued)

*Primary Examiner* — Matthew Wiblin
(74) *Attorney, Agent, or Firm* — Reising, Ethington, P.C.

(57) ABSTRACT

A pneumatic actuator and control valve assembly has a housing with a control cavity for a control valve and an actuator cavity for an actuator piston and rod assembly. The control cavity and actuator cavity both have an elongated shape and are substantially parallel to each other. The control cavity has a supply port and first and second control valve outlet ports and at least one vent port with the control valve being movable through the control cavity for controlling communication between the supply port and the first and second outlet ports. The actuator cavity has first and second ports at the retracted and extended ends for shuttling (Continued)

the piston and within the actuator cavity between a retracted and extended end position. The housing has a first inlet and second inlet for passage of pressurized fluid to and from the housing.

4 Claims, 11 Drawing Sheets

(56) References Cited

U.S. PATENT DOCUMENTS

| | | | |
|---|---|---|---|
| 3,396,751 | A | 8/1968 | Bender |
| 3,818,800 | A | 6/1974 | Bertaux |
| 4,216,700 | A | 8/1980 | Iida |
| 5,020,419 | A | 6/1991 | Amedei et al. |
| 5,133,380 | A | 7/1992 | Jamieson, III et al. |
| 6,375,156 | B2 | 4/2002 | McGeachy |
| 7,735,518 | B2 | 6/2010 | Williams et al. |
| 9,341,274 | B2 | 5/2016 | Miyazoe et al. |
| 9,512,860 | B2 | 12/2016 | Horikawa et al. |
| 9,903,487 | B2 | 2/2018 | Bell et al. |
| 2001/0042435 | A1 | 11/2001 | Porter et al. |
| 2008/0250918 | A1* | 10/2008 | Strong .................. F15B 15/204 91/275 |
| 2009/0007771 | A1 | 1/2009 | Matsumoto |
| 2011/0120120 | A1 | 5/2011 | Pawelski et al. |
| 2012/0198991 | A1 | 8/2012 | Engels et al. |
| 2017/0328387 | A1 | 11/2017 | Pryssander |
| 2018/0094746 | A1 | 4/2018 | Zhang et al. |
| 2018/0355999 | A1 | 12/2018 | Villeret et al. |
| 2020/0002522 | A1 | 1/2020 | Gubbels |

FOREIGN PATENT DOCUMENTS

| | | | |
|---|---|---|---|
| CN | 108071842 | A | 5/2018 |
| CN | 109764154 | A | 5/2019 |
| DE | 102016125139 | A1 | 6/2018 |
| EP | 3470687 | A1 | 4/2019 |
| WO | 200405338 | A1 | 6/2004 |
| WO | 2018056037 | A1 | 3/2018 |
| WO | 2018086824 | A1 | 3/2018 |
| WO | 2018202290 | A1 | 11/2018 |
| WO | 2018202291 | A1 | 11/2018 |
| WO | 2018228705 | A | 12/2018 |

OTHER PUBLICATIONS

China Patent Office Action, Chinese Application No. 201980101551.8, Applicant; Asco, L.P. Dated: Nov. 1, 2023.

* cited by examiner

VALVE MANIFOLD, VALVE AND ACTUATOR ASSEMBLY

This application is a divisional application of pending application U.S. Ser. No. 17/770,497 filed on Apr. 20, 2022.

TECHNICAL FIELD

This invention relates to a valve manifold control system and more particularly to a system that uses an integrated housing that contains a control valve, a valve manifold and an actuator that can be connected serially to other like housings.

BACKGROUND OF THE DISCLOSURE

Field bus systems incorporating a manifold assembly are commonly used in an industrial line to selectively direct pneumatic pressure to various pneumatically operated field devices. The manifold assembly is commonly modular and is assembled from a plurality of individual fieldbus modules including I/O modules, a communication module, and manifold members. The manifold member includes one or more control valves in a housing mounted onto a manifold block. The control valves often include a spool valve that slides in a cylinder cavity and is operated by pilot pressure that is selectively provided by a solenoid coil and valve assembly when the solenoid coil is actuated. The manifold member often has a common pilot pressure passage and main pressure passage that are connected to the solenoid valve that controls the control valve which in turn controls the flow of main pressure to a respective pneumatic actuator for a field device. The pneumatic actuator is often operated by a piston with an actuator arm and cylinder assembly where the piston and actuator cycle between a retracted position to an extended position and vice versa within the cylinder.

The actuator with its piston and cylinder is often in a separate housing remote from the manifold assembly and connected to the manifold through pneumatic tubing.

The manifold assemblies have the capacity to incorporate many manifold blocks and valve stations connected together to form a bank of valve manifold blocks which in turn operate many remote field devices in a large manufacturing or industrial line. Because each manifold block is individually connected to a respective piston and cylinder assembly, there are many pneumatic tubes extending between the bank of manifold valve stations and the various remote field device actuators.

In addition, each control valve needs to be correctly operating to maintain correct operation of the respective field device. Failure of a single solenoid coil and control valve and its respective pneumatically operated field device may cause an entire manufacturing or industrial line to cease operating. It is thus preferable to maintain each field device and its control valve and connecting tubing in operating condition and to replace any component before its failure during scheduled maintenance and normal down time to prevent unscheduled cessation of the line. However, monitoring of only the solenoid and control valve provides a limitation. Monitoring of only the solenoid and control valve does not provide any information about of any problems downstream i.e. at the actuating valve or within the field device itself. Hence it is highly desirous and advantageous to determine if and when there is any discrepancy between the current actuating state of a solenoid coil and the actuating position of the piston in its respective cylinder.

What is desired is to provide an expeditiously constructed housing that contains the control valve, manifold pneumatic passages and the actuator piston and cylinder assembly for the field device. What is also desired is a multi-position pneumatic piston and actuator cylinder assembly that compares the actuation state of the control valves with the position of the actuator piston and provides a warning indicator if the control signal does not match the sensed actuation state of the actuating piston. What is also desired is a plurality of the expeditiously constructed housings that are pneumatically serially connected together to form a continuous pneumatic manifold through a series of housings. What is also desired is a pneumatic housing assembly that has controlling valves and electronics integrated therein to reduce space requirements and simplify the required pneumatic and electronic communication connections. What is also desired is a pneumatic actuator that has electronics and pneumatic connectors that makes remote control possible and also provide easy connections directly to other similar pneumatic actuators.

SUMMARY OF THE DISCLOSURE

According to one aspect of the invention, a pneumatic actuator and control valve assembly has a housing with a control cavity i.e. a cylinder for a control valve and an actuator cavity i.e. a cylinder for an actuator piston and piston rod assembly. The control cavity and actuator cavity both have an elongated shape and are substantially parallel to each other. The control cavity has a supply port and first and second control valve outlet ports and at least one vent port with the control valve being movable through the control cavity for controlling communication between the supply port, the first and second outlet ports, and the vents. The actuator cavity has first and second ports at opposite ends ends for shuttling the piston within the actuator cavity between retracted and extended end positions. The housing has a first inlet and second inlet for passage of pressurized fluid to and from the housing, The housing has a supply passage extending from one of the first and second inlets to the control cavity and a first and second flow path in selective communication to the supply passage for supplying pressurized fluid from the supply passage to either the first or second ports of the actuator cavity depending on the actuation state of the control valve. The piston and piston rod assembly includes a piston that is slidably movable within the actuator cavity to move the piston rod between a retracted position and an extended position with respect to the housing based on the status of the control valve providing pressurized fluid from the supply passage and to one of the first and second flow paths.

Preferably, the housing is generally elongated in shape with a central longitudinal axis. It has four relatively flat sides with each side being substantially perpendicular to an adjacent side that form four edges about the periphery of the housing. The actuator cavity is preferably substantially round in cross section and extends axially along and between the flat sides along the central longitudinal axis. The control valve cavity is preferably interposed between the actuator cavity and one of the edges of the housing. Both control valves are preferably a valve spool sleeve that is slidably mounted in the respective control cavities.

Preferably, the housing has a second control cavity for a second control valve that is aligned with the previously mentioned control cavity. The second control cavity is also elongated and is substantially parallel to the actuator cavity. The piston and rod assembly is a multi-stage piston and rod assembly having a first stage piston and second stage piston and a first stage rod and second stage rod where the first stage piston is in a first section of the actuator cavity and the second stage piston is in a second section of the actuator cavity, The first section of the actuator cavity has ports connected to the control cavity and the second section of the actuator cavity has ports connected to the second control cavity.

Preferably, the pneumatic actuator and control valve assembly are connectable to other like pneumatic actuator control valve assemblies by a conduit extending from the second inlet of the housing to a first inlet of a like integrated pneumatic actuator.

In one embodiment, the housing has two head caps at opposite ends with a first and second plate member and a middle head plate assembled together. Solenoid pilot valves for each control valve are mounted on the exterior of the middle plate. Each first and second plate member forms the respective first and second section of the actuator cavity. The supply passage extends to a port in communication with the solenoid pilot valves. A pilot passage extends from the solenoid pilot valve to an end section of the control cavity. Control electronics and position sensors are housed in the housing.

In accordance with another aspect of the invention, a pneumatic actuator and control valve assembly has a first housing with a control cavity for a control valve and an actuator cavity for an actuator piston and rod. The control cavity has a supply port and first and second control valve outlet ports and at least one vent port with the control valve being movable through the control cavity for controlling communication between the supply inlet, the first and second outlet ports, and the vents. The actuator cavity has first and second ports at the retracted and extended ends for shuttling the piston within the elongated actuator cavity to move the rod between retracted and extended positions relative to the housing. The first housing has first and second flow paths for supplying and discharging pressurized fluid to and from ports of the control cavity for supplying and discharging of fluid within the first and second flow paths depend on the actuation state of the control valve. A piston and rod assembly includes a piston that is slidably movable within the actuator cavity to move the rod between a retracted and extended position relative to the housing. The first housing has a first inlet and second inlet for supplying pressurized fluid to the supply inlet port. The first housing has its second inlet fluidly connected to a first inlet of a second housing of a second pneumatic actuator assembly. Preferably, the integrated pneumatic actuator and control valve assembly is connected to a second integrated pneumatic actuator by a conduit extending from the second inlet of the first housing to a first inlet of a second housing of the second integrated pneumatic actuator.

In accordance with another aspect of the invention, a multi-stage piston and rod assembly has a cylinder housing with a first piston receiving section and second piston receiving section. A first piston has an internal rod abuttable to the second piston and the second piston has an externally extending rod extending outside of the cylinder housing. The cylinder has pressure ports to provide the pistons to shuttle within their respective first and second piston receiving sections to provide for a retractable position, an intermediate position and a fully extended position of the externally extending rod. At least one position sensor is operably connected to each piston and a first and second piston receiving sections such that the fully retractable, intermediate and fully extended positions can be sensed.

BRIEF DESCRIPTION OF THE DRAWINGS

Reference now is made to the accompanying drawings in which.

DETAILED DESCRIPTION OF THE PREFERRED EMBODIMENT

Figure 1:
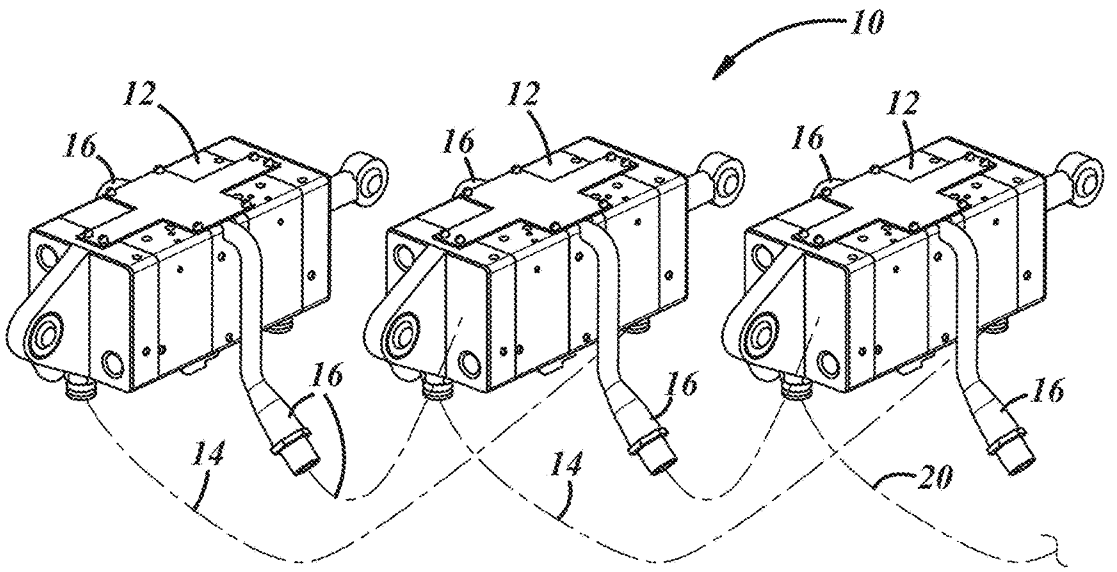
FIG. 1 is a perspective and overview of one embodiment according to the invention illustrating a plurality of valve units and actuator assemblies operably connected together.

Referring now to FIG. 1, a pneumatic actuator and control valve assembly 10 has a plurality of housing members 12 connected together via pneumatic conduits 14 and communication cables 16. The first housing 12 has one of its communication cables 16 connected to a main communication unit of an ethernet or other control (not shown) and is connected to a pneumatic supply conduit 20 connected to a main air manifold or air source (not shown).

Figure 2:
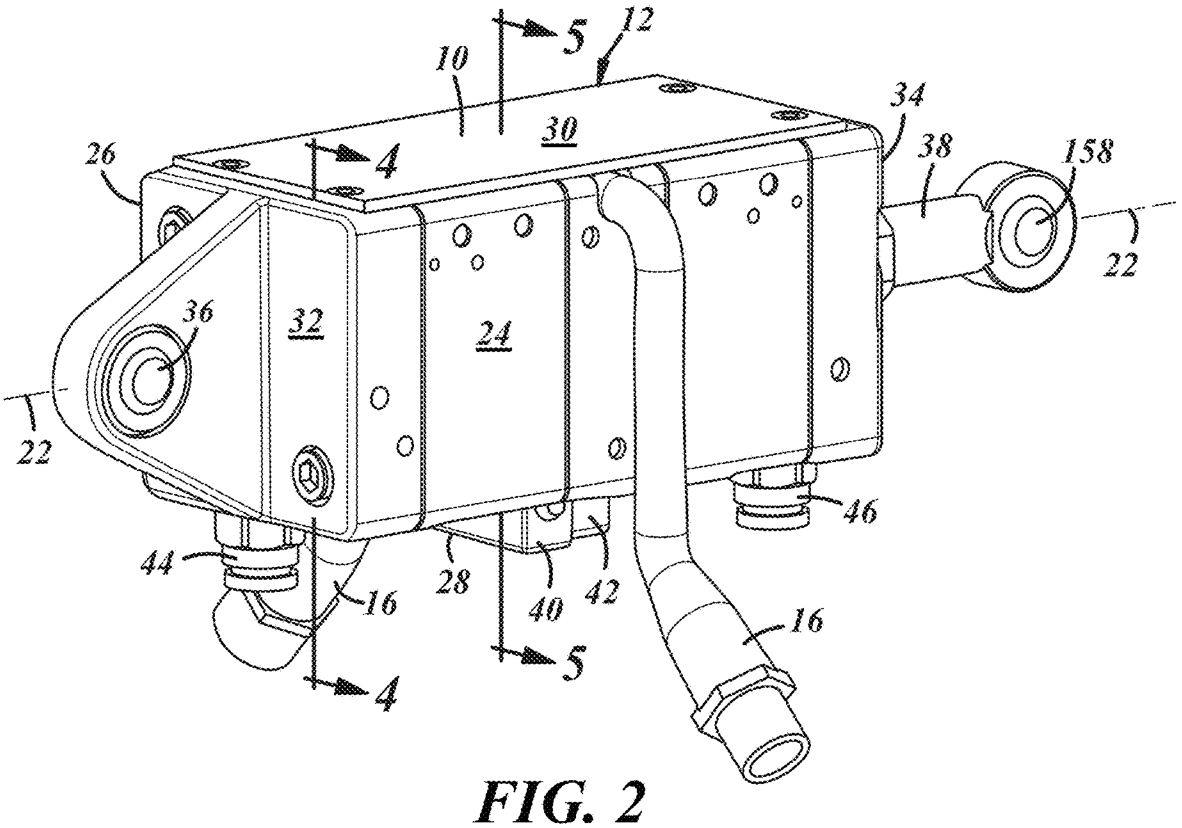
FIG. 2 is an enlarged perspective view of one valve unit and the actuator assembly shown in FIG. 1.

Referring now to FIGS. 2-14, the housing 12 is described in detail. FIG. 2 illustrates the housing 12 being of generally elongated along a major longitudinal axis 22 and having four substantially flat sides 24, 26, bottom 28, and top 30 (also referred to as sides) and flat ends 32 and 34. The flat side 24, 26, 28 and 30 meet at rounded edges 35, 37, 39 and 41. End 32 may have an anchor mount 36 and end 34 may have an piston rod 38 extending therefrom. The bottom 28 has air inlet ports 44 and 46 and two solenoid actuators 40 and 42 mounted thereunder.

Figure 3:
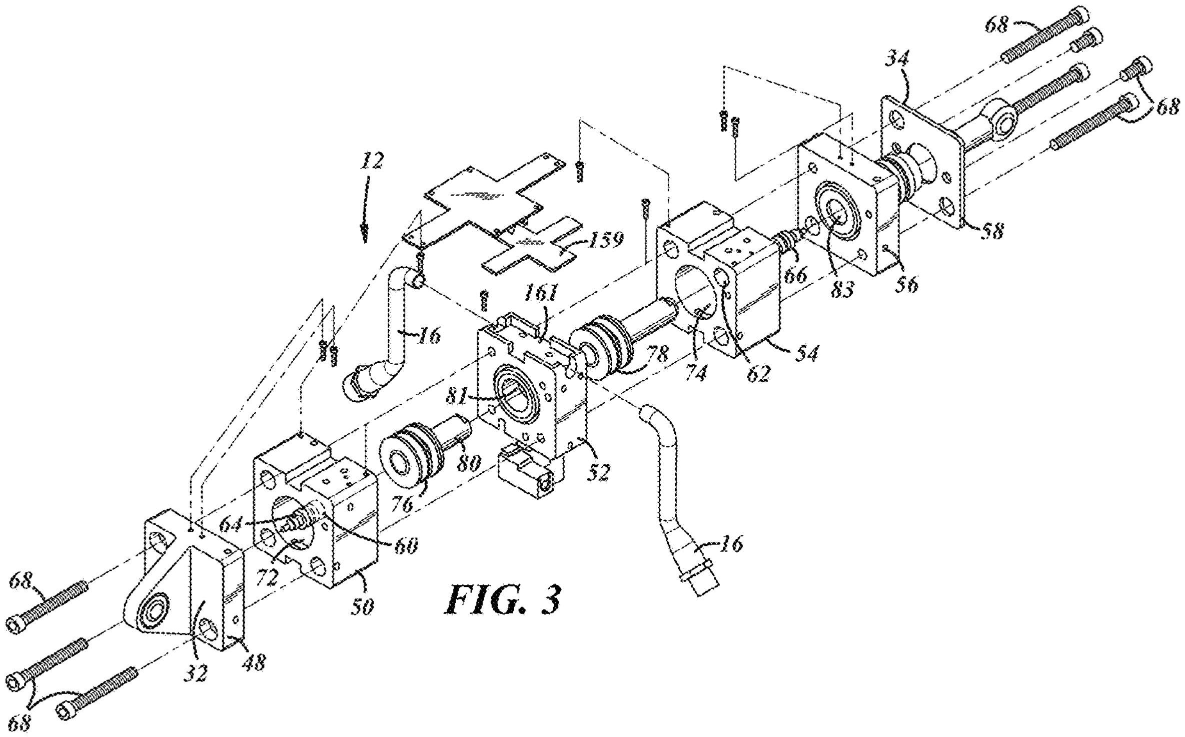
FIG. 3 is an exploded perspective view of the valve unit and actuator assembly shown in FIG. 2.

As more clearly shown in FIG. 3, the housing 12 may be made of plate components i.e. an anchor end plate 48, first actuator cavity plate 50, a central solenoid actuator mounting plate 52, a second actuator cavity plate 54, a piston rod sealing plate 56 and end plate 58 that are assembled together with appropriate bolts 68 and seals 70.

Figure 4:
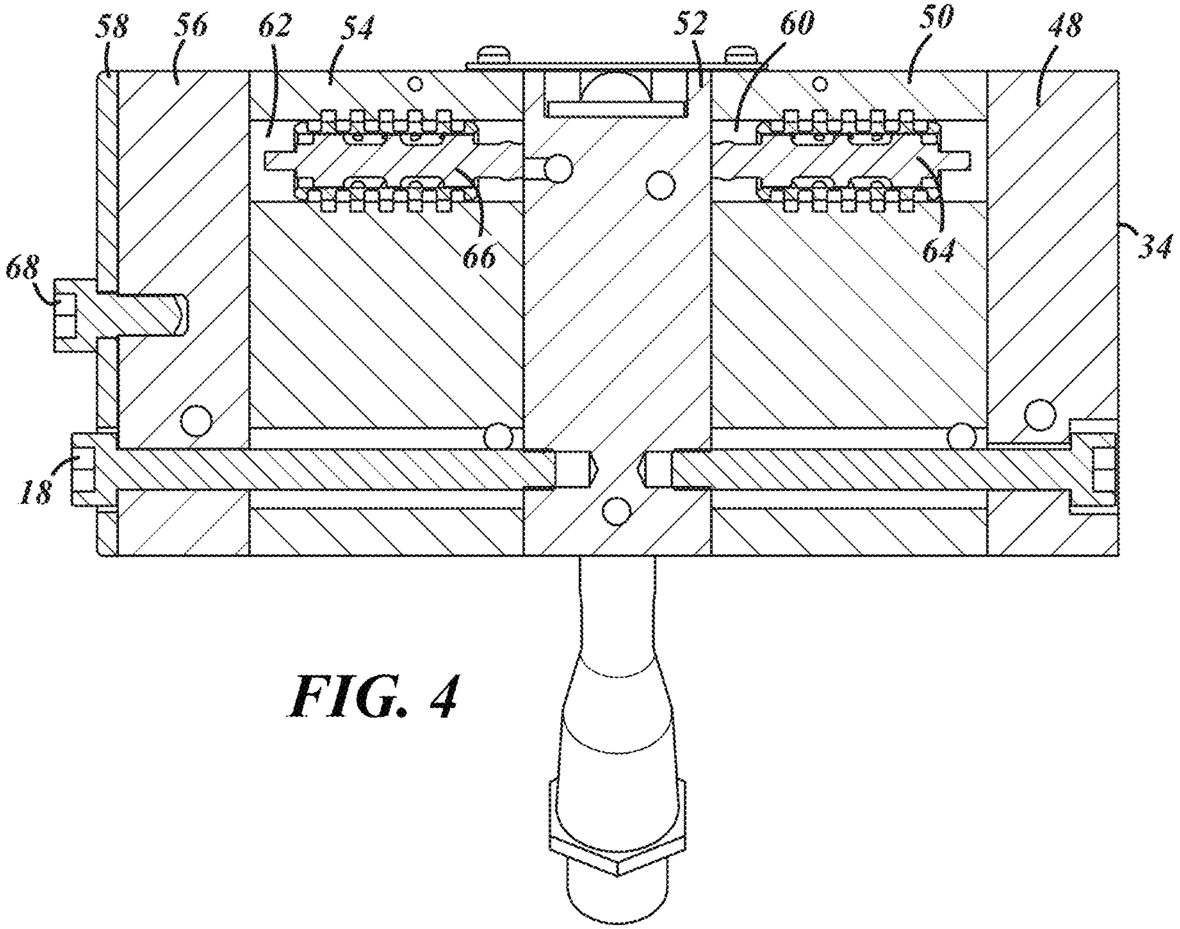
FIG. 4 is a sectional view taken along lines 4-4 shown in FIG. 2.
Figure 5:
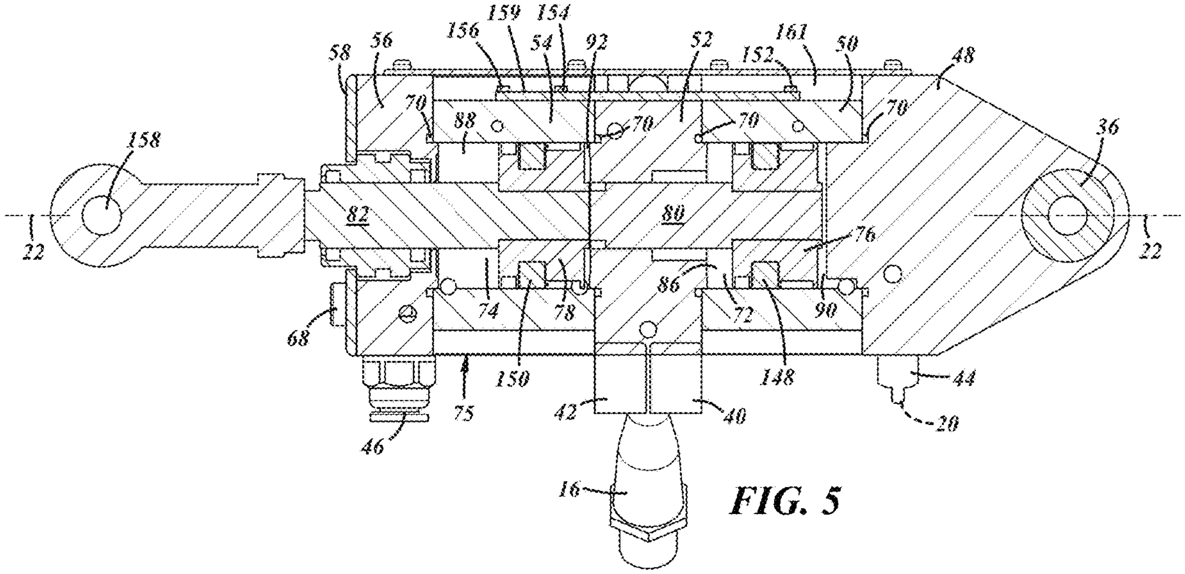
FIG. 5 is a sectional view taken along lines 5-5 shown in FIG. 2 with the piston shown in the fully retracted position.

Referring now to FIGS. 4 and 5, the first actuator cavity plate 50 and second actuator cavity plate 54 each have control cavities 60 and 62 for slidably mounting two spools sleeves 64 and 66. These spool sleeves 64 and 66 control the passage of pneumatic pressure from supply conduit 20 to a respective actuator cavity 72 and 74 in the first and second actuator plates 50 and 54 to control the motion of a multistage piston cylinder assembly 75 and controls the position of the first piston 76 and second piston 78 along with extension arm 80 and extension arm 82. The cavities 60, 62, 72 and 72 are most commonly circular in cross section and are commonly referred to as cylinders.

Figure 6:
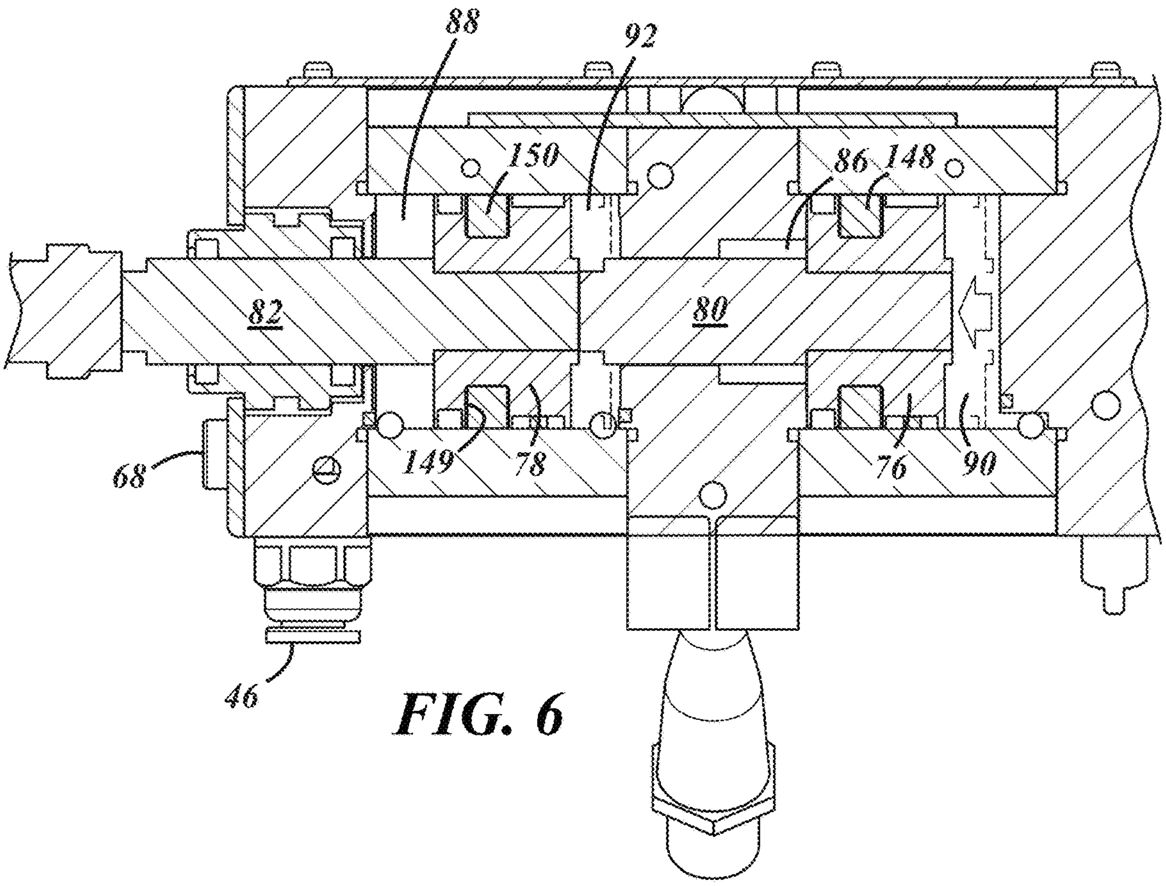
FIG. 6, is a view similar to FIG. 5 showing the piston in the one-half extended position.
Figure 7:
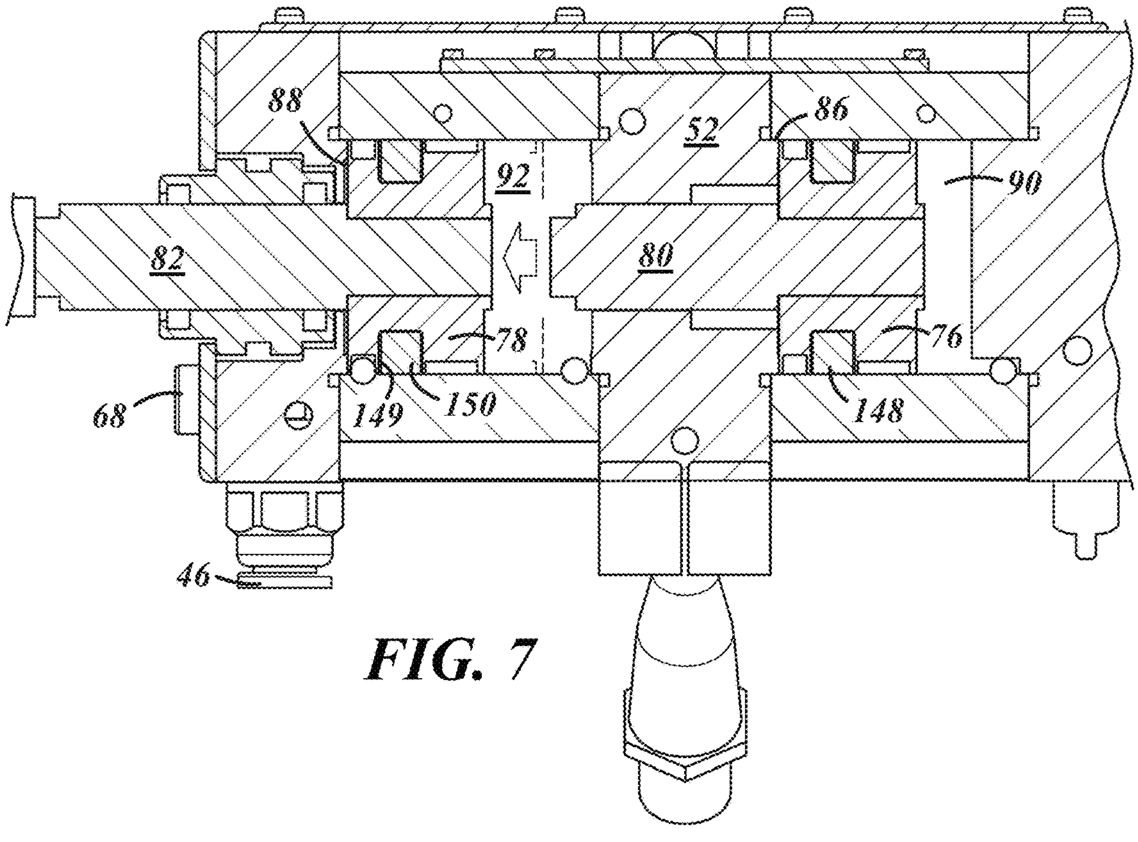
FIG. 7 is a view similar to FIG. 5 showing the piston in the fully extended position.

Referring now to FIGS. 5, 6 and 7, the multistage piston cylinder assembly 75 is shown at its three positions. FIG. 5 shows the piston cylinder assembly 75 in its fully retracted position (toward the right as shown in the drawings) where the extension arm 82 is also fully retracted toward the right. This position occurs when pneumatic pressure is applied to the left sections 86 and 88 of actuator cavities 72 and 74. Furthermore sections 90 and 92 are vented to prevent resistant back pressure. Alternatively, actuator section 86 may also be vented and pneumatic pressure may be only in section 88. As shown in FIG. 6, when pneumatic pressure is applied to section 90, and section 88 is vented to prevent vacuum pressure, the pistons 76 and 78 are moved to the intermediate position. Piston 76 has its extension arm 80 pass through a passage 81 to abut piston 78. Extension arm 82 only protrudes one-half way out of housing 12 through passage 83 in plate 56.

When pneumatic pressure is then applied to actuator cavity section 92 and section 88 is vented to prevent resistant back pressure, the piston 78 moves further to the left as shown in FIG. 7 and separates from extension arm 80. Piston 78 and extension arm 82 then become fully extended. The multistage piston 75 can then reverse its motion with the appropriate spool sleeve control.

Figure 8:
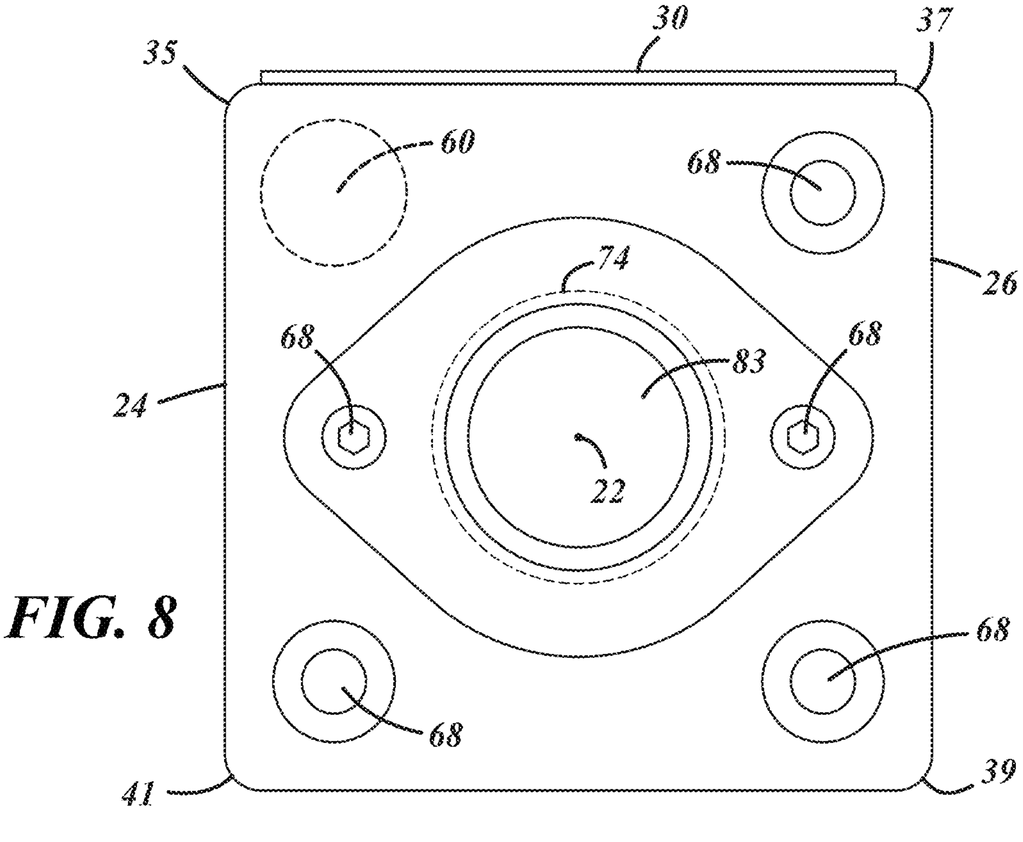
FIG. 8 is an end view of the housing shown in FIG. 2 illustrating the relative positions of the spool cavity 60 and actuator cavity 72.

As illustrated in FIGS. 3 and 8, the control cavities 60 and 62 are aligned with each other. Furthermore, the control cavities 60 and 62 are substantially parallel to the longitudinal axis 22 of the housing 12 and are substantially parallel to the axial extent of the actuator cavities 72 and 74 that extend along longitudinal axis 22. The control cavity 60 and 62 are interposed between the actuator cavity 72 and 14 and corner edge 35.

Figure 9:
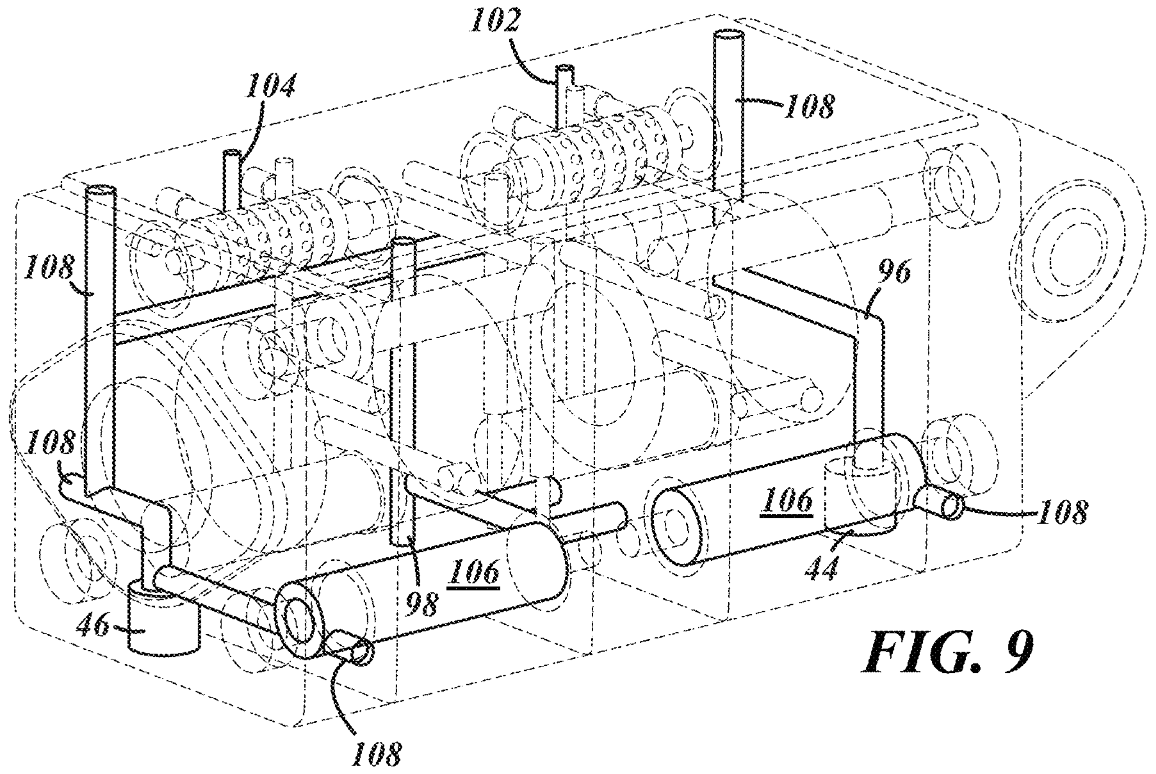
FIG. 9 is a perspective view highlighting the internal supply paths within the housing.
Figure 10:
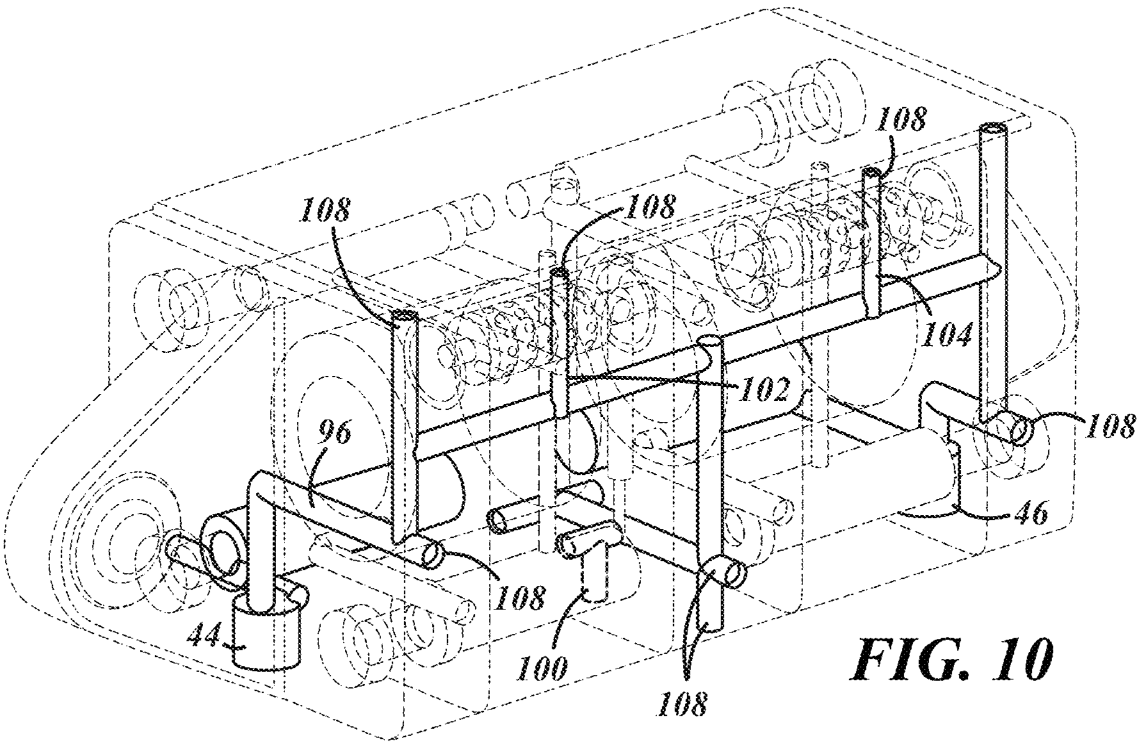
FIG. 10 is another perspective view highlighting the internal supply paths within the housing.

The air supply i.e. pneumatic pressure is supplied from supply conduit 20 to both the control cavities 60 and 62 as shown in FIGS. 9 and 10 through inlet 44 which leads to supply conduits 96 which leads to legs section 98 and 100 that lead to the respective pilot solenoid valves 40 and 42. In addition the supply conduits 96 also lead to supply port 102 and 104 to each control cavity 60 and 62 to be opened and closed by spools sleeves 64 and 66. It is noted that certain sections 106 of the conduits 96 have enlarged diameters to provide greater air supply and to create a buffer in pneumatic pressure fluctuation to the control spool sleeves 64 and 66. Also, the conduits 96 connect inlet 44 to inlet 46 so that inlet 46 may connect to inlet 44 of a subsequent housing 12 as shown in FIG. 1.

Figure 11:
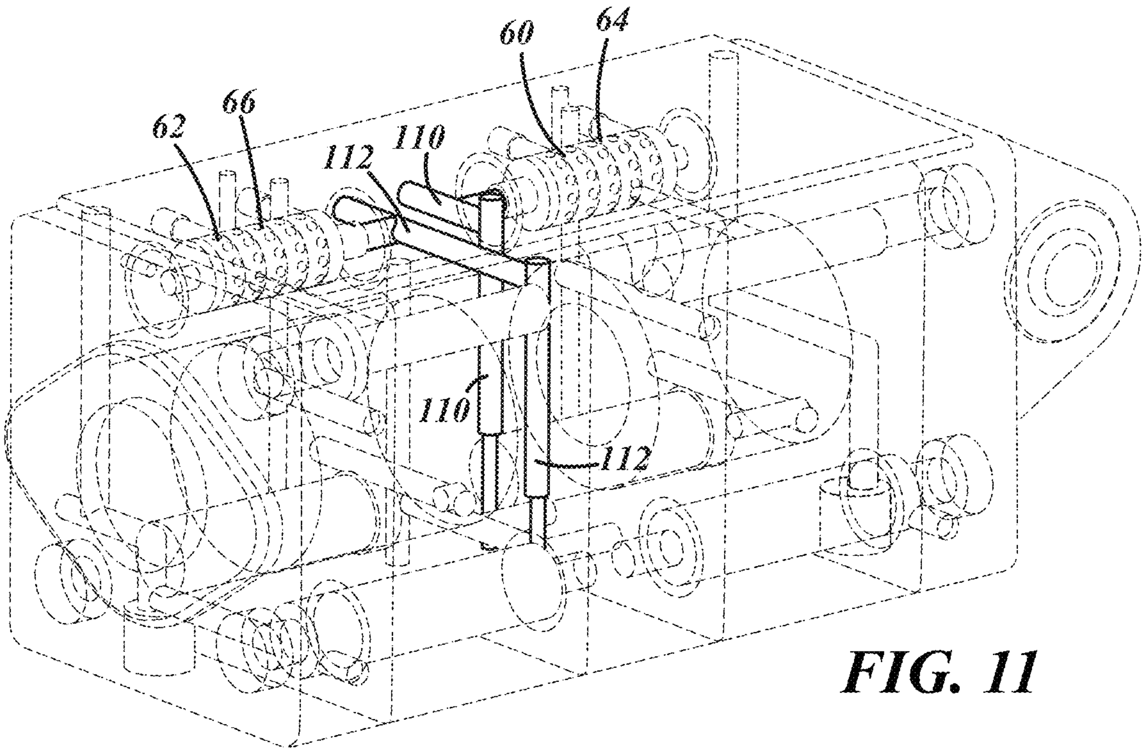
FIG. 11 is a view similar to FIG. 9 highlighting the internal pilot pressure paths within the housing.
Figure 12:
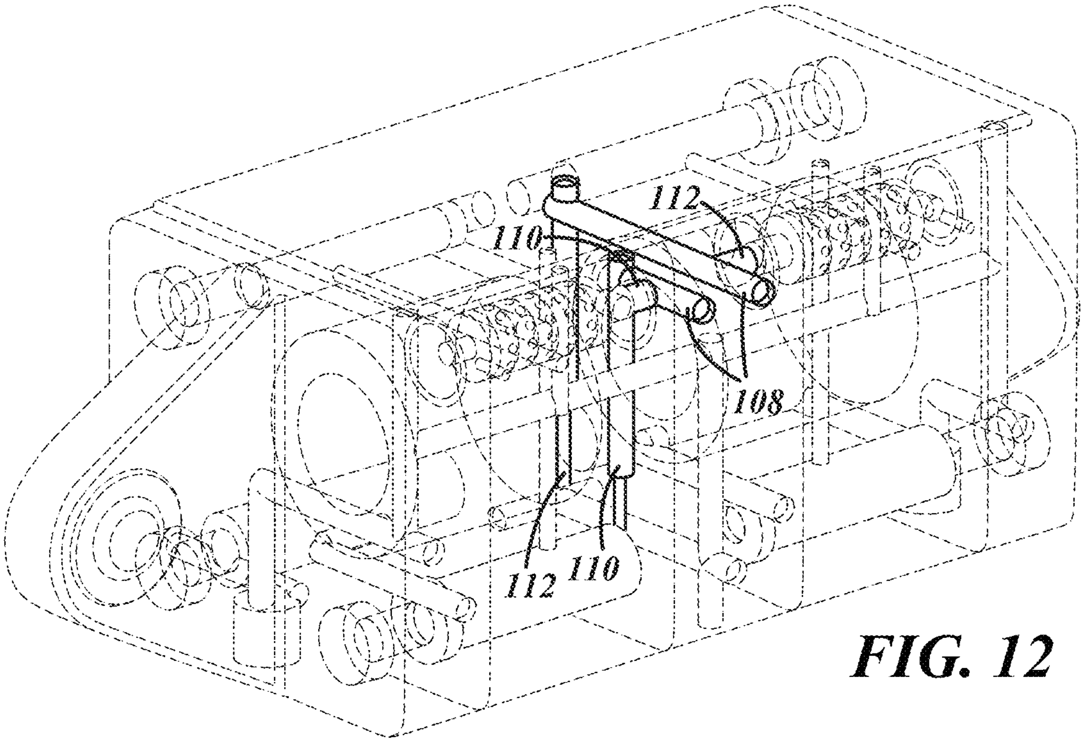
FIG. 12 is a view similar to FIG. 10 highlighting the internal pilot pressure paths within the housing.

When the solenoid valves 40 and 41 mounted on the bottom wall 28 are actuated, they allow pneumatic pressure to pass from supply conduits 98 and 100 as shown in FIGS. 9 and 10 to pilot pressure conduits 110 and 112 as highlighted in FIGS. 11 and 12. Each respective pilot pressure conduit 110 and 112 opens to an end of control cavity to push spool sleeve 64 and 66 within its respective cavity against a spring bias of a spring not shown mounted at the other end of the respective control cavity 60 and 62. Alternatively, instead of a return spring, the spool sleeve may be returned by pneumatic pressure applied to its backside in conventional fashion.

Plugged legs sections 108 are for manufacturing drilling expediency and may be eliminated if other manufacturing techniques are used such as additive manufacturing to produce the housing 12.

Figure 13:
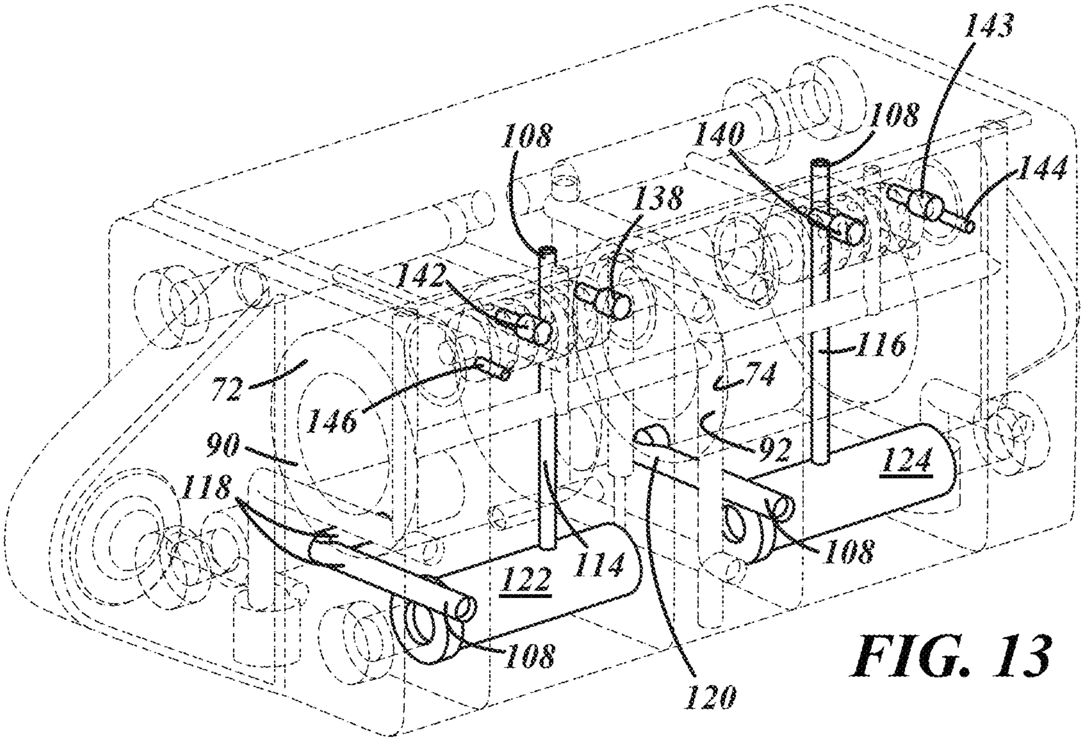
FIG. 13 is a view similar to FIG. 9 highlighting the internal extending pressure paths.

Referring now to FIG. 13, when the spool sleeves are moved to a certain position by actuation of the solenoid valves, they open the communication between the supply conduits 96, 102, and 104 as shown in FIGS. 9 and 10 to extension conduits 114 and 116 which lead to the extension ports 118 and 120 that open to sections 90 and 92 of the first and second actuator cavities 72 and 74. Part of the extension conduits have enlarged sections 122 and 124 to provide increased pneumatic supply.

Figure 14:
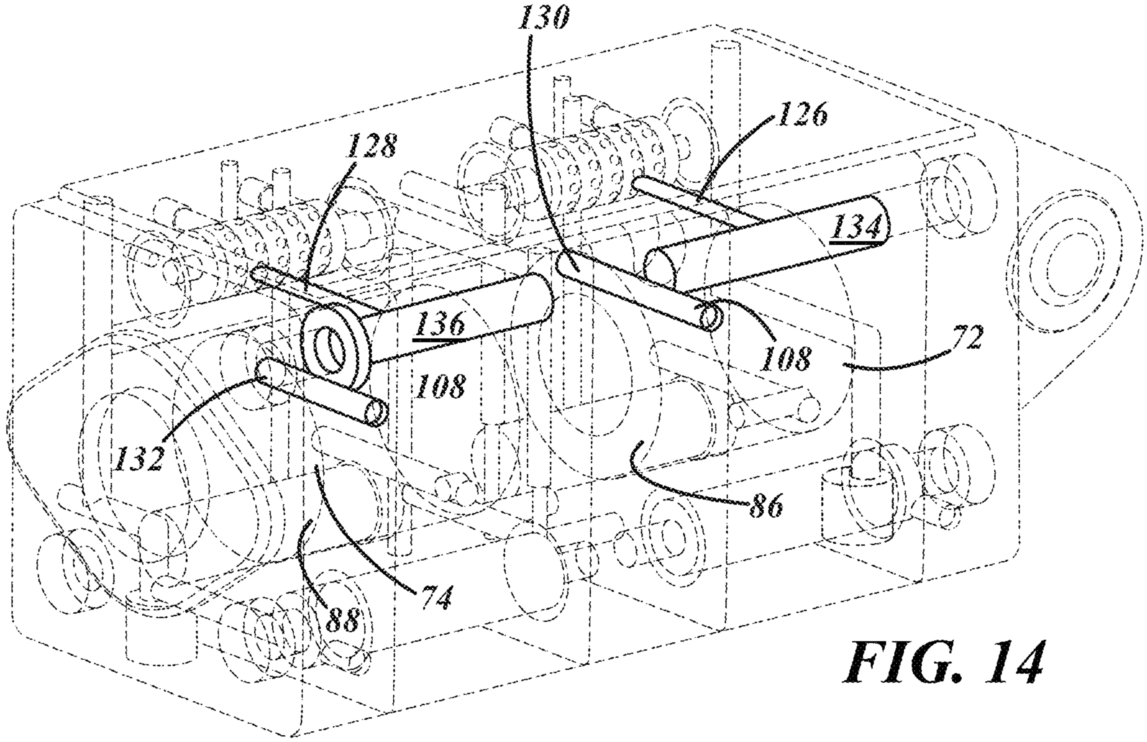
FIG. 14 is a view similar to FIG. 10 highlighting the internal retracting pressure paths and vent paths.

Referring now to FIG. 14, when the spool sleeve is moved to its spring bias position (or a return piston position), i.e. when the solenoid valves are deactuated, it opens the air supply conduits 96 102 and 104 as shown in FIGS. 9 and 10 to retraction conduits 126 and 128 which lead to ports 130 and 132 open to the sections 86 and 88 of the first and second actuator cavities 72 and 74. The ends of control cavities 60 and 62 opposite ports pilot conduit ports 110 and 112 have respective pilot vents 144 and 146. Parts of the retraction conduits have enlarged section 134 and 136 to provide increased pneumatic supply.

When the spool sleeves shut off communication of the air supply conduits 102 and 104 from the extension conduits 114 and 116, the spool sleeves open communication of the extension conduits 114 and 116 to the respective vent ports 138 and 140. Similarly, when the spool sleeves shut off communication of the air supply conduits 102 and 104 from the retraction conduits 126 and 128, the spool sleeves open communication of the return conduits 126 and 128 to the respective vent ports 142 and 143.

In addition, magnets 148 and 150 may be attached to pistons 76 and 78. These magnets sit in a pre-existing groove 149 for a wear bar and wraps cylindrically about the piston. The magnets can be sensed by Hall sensors 152, 154, and 156 appropriately placed on a printed circuit board 159 mounted in upper cavity 161 of housing 12. The Hall sensors are connected to appropriate wiring passing to communication cables 16.

In operation, control of the actuator housing is from a remote main communication module either by through cable 16 or via wireless communication. The solenoid actuators 40 are selectively actuated or deactuated and the pistons move within the cylinders to the appropriate positions. The Hall sensors detects the position of the pistons and the signal is sent back to the main communication module which compares the actual position of the pistons with the directed state of the pistons. If the actual position does not correlate with the control signals from the main communication module, the main communication module can send an appropriate flag or warning to an operator or shut down the actuator housing 12 to prevent incidents.

The anchor mount 36 for mounting to a stationary base (not shown) provides that the piston rod 38 provides proper motion. The end of piston rod 38 has a mount 158 to be mounted to an operating part of the field device (not shown).

While the first embodiment shows a multi-stage piston with three positions controlled by two spool sleeves and two solenoid actuators, an alternative embodiment in accordance with the invention is shown in FIGS. 15-19 which utilizes a single spool valve and a single piston capable of a fully retracted and fully extended position.

Figure 15:
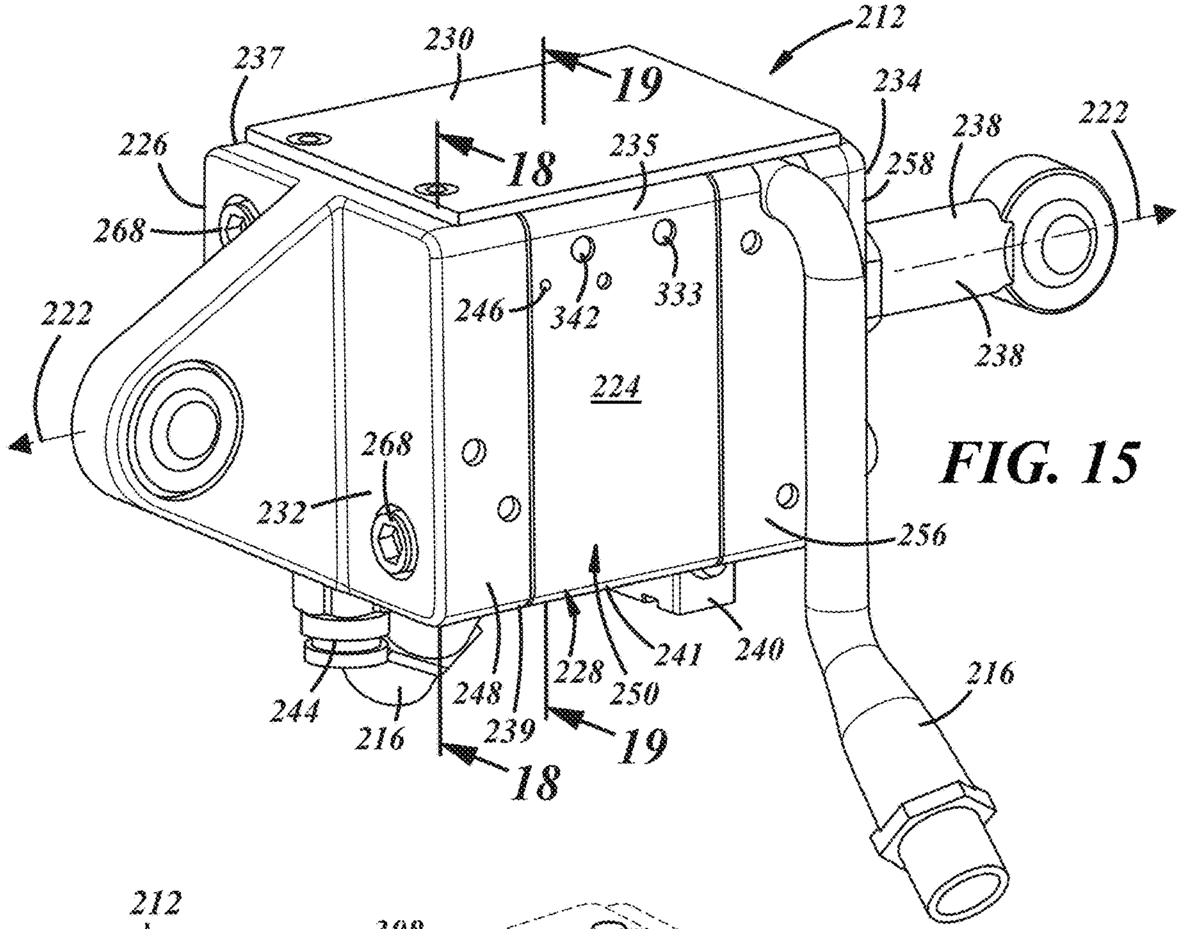
FIG. 15 is a perspective view of another embodiment of the invention.

Referring now to FIG. 15, an individual housing 212 is generally elongated along a major axis 222 and having four substantially flat sides 224, 226, bottom 228, and top 230 (also referred to as sides) and flat ends 232 and 234. The flat sides 224, 226, 228, and 230 meet at rounded edges 235, 237, 239, and 241. End 232 may have an anchor mount 236 and end 234 may have an piston rod 238 extending therefrom. The bottom 228 may have a solenoid actuator 240 mounted thereunder and also have air inlet ports 244 and 246. The housing 212 may be made of plate components that are assembled together with appropriate bolts 268 such as an anchor end plate 248, an actuator cavity plate 250, a piston rod sealing plate 256 and end plate 258.

Figure 19:
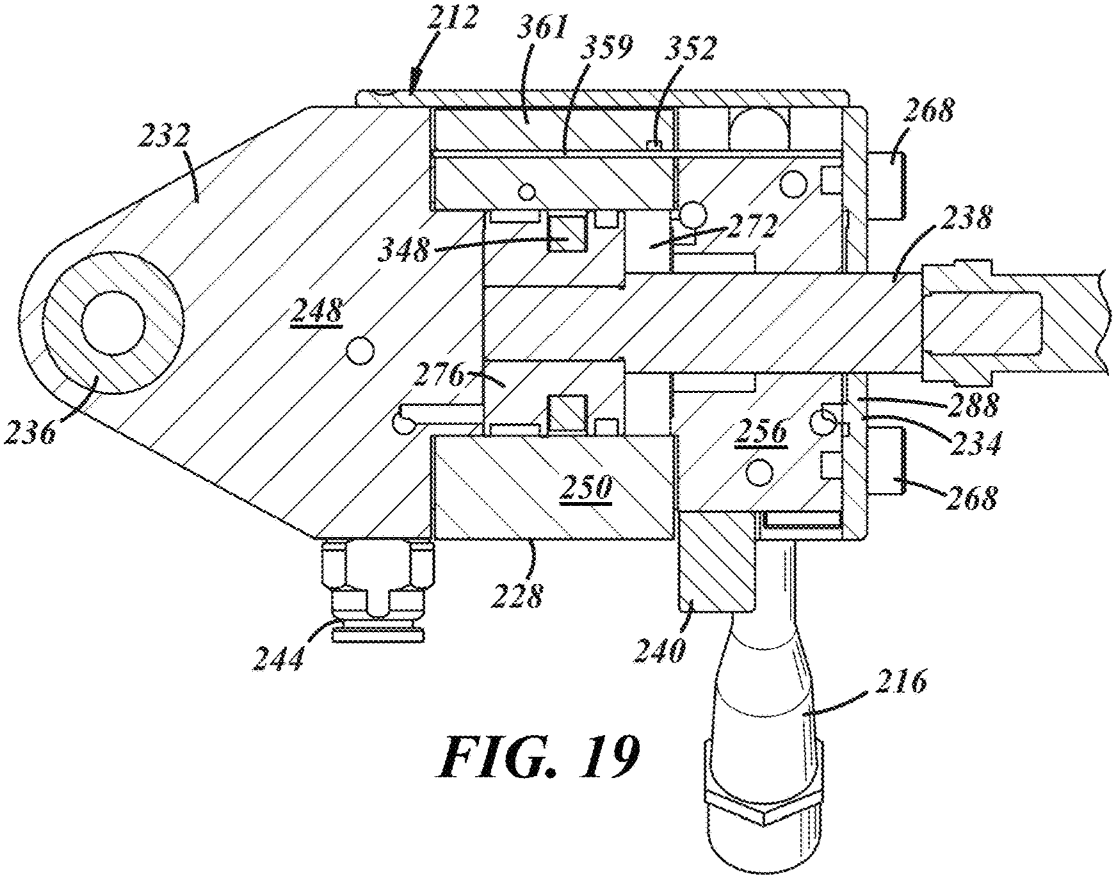
FIG. 19 is a sectional view taken along lines 19-19 shown in FIG. 15.

Referring now to FIGS. 16-19, the actuator cavity plate 250 has control cavity (i.e. cylinder) 260 for slidably mounting a spool sleeve 264. The spool sleeve 264 controls the passage of pneumatic pressure from supply inlet 244 to an actuator cavity i.e. cylinder 272 in the actuator plate 250 to control the motion of a piston 276 with its extension arm 238 as shown in FIG. 19.

The control cavity 260 is substantially parallel to the longitudinal axis 222 of the housing 212 and is substantially parallel to the axial extent of the actuator cavity 272 along longitudinal axis 222.

Figure 16:
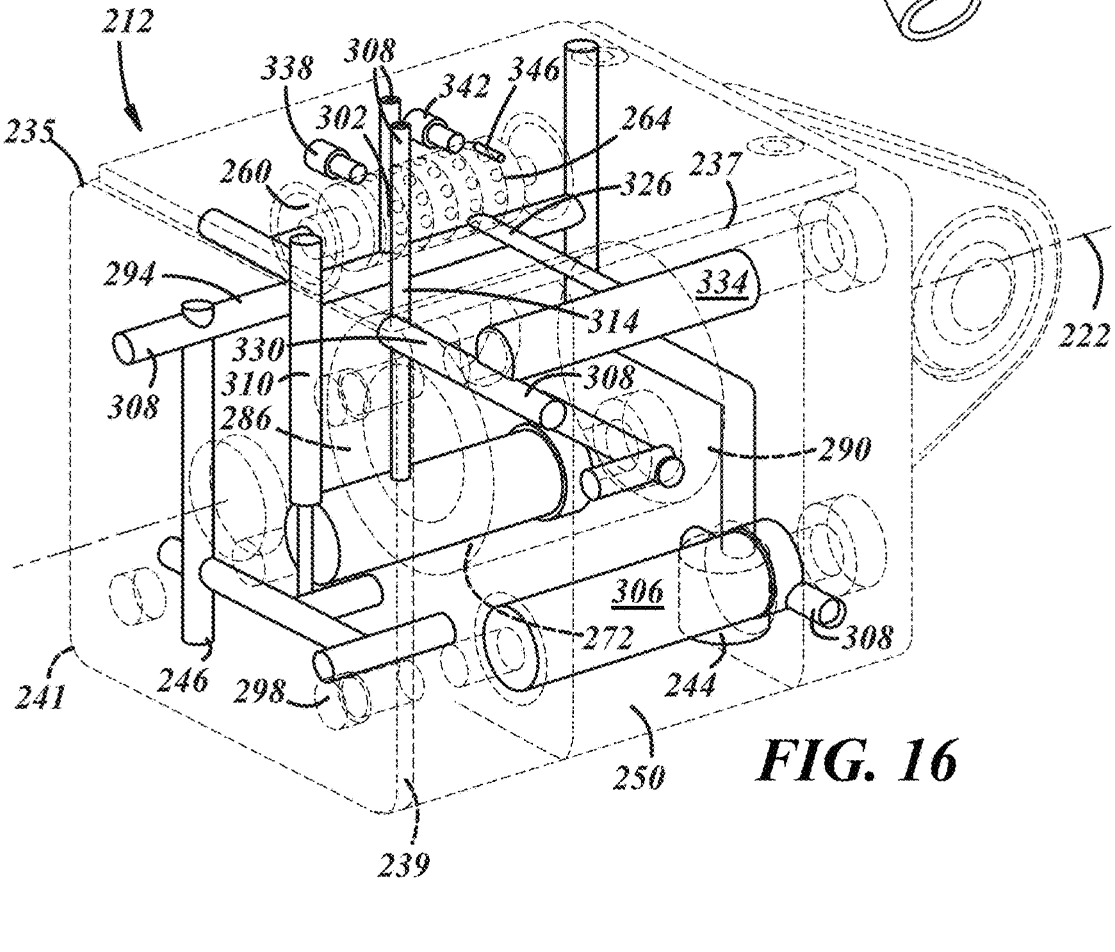
FIG. 16 is a perspective view from the opposite side from FIG. 15, of the internal pressure paths within the housing.
Figure 17:
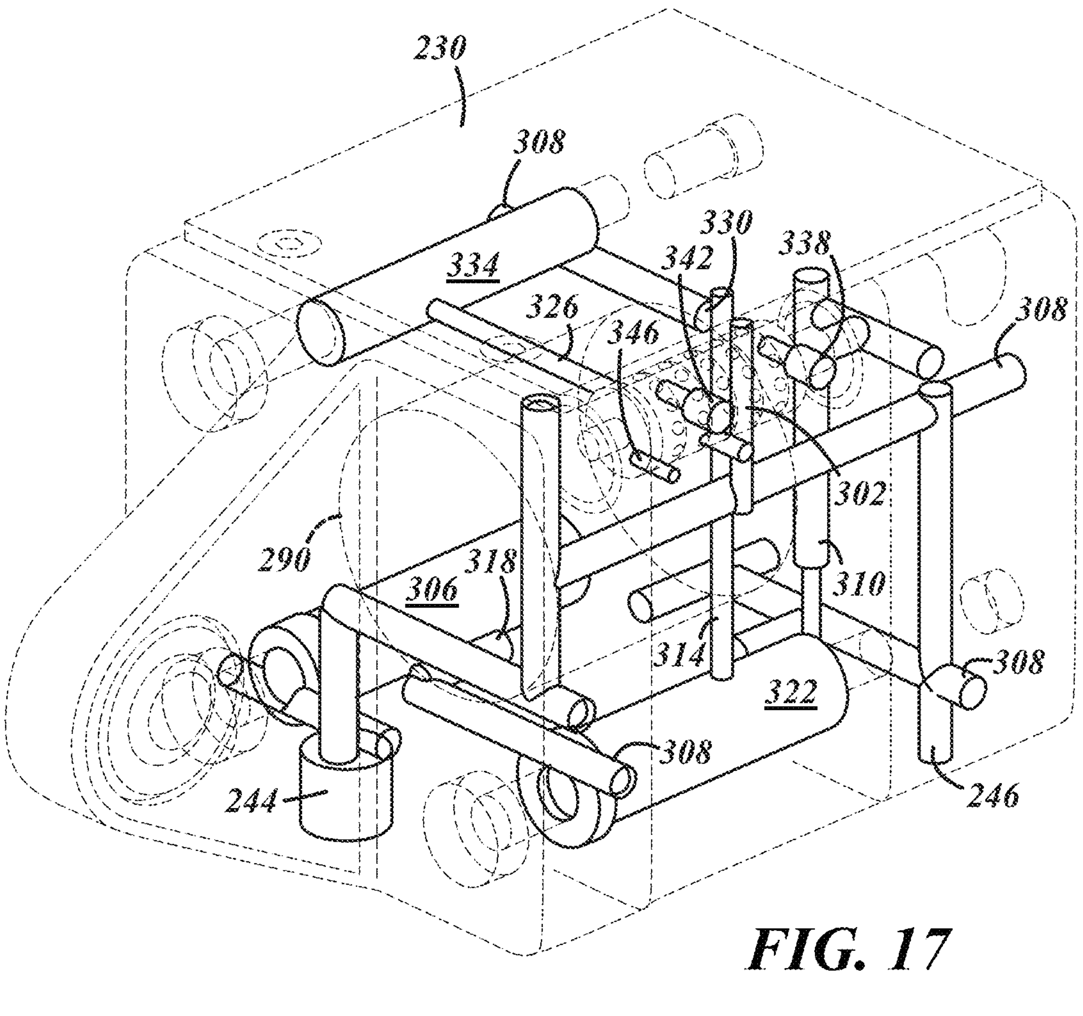
FIG. 17 is a view similar to FIG. 15 highlighting the internal pneumatic pressure paths within the housing.
Figure 18:
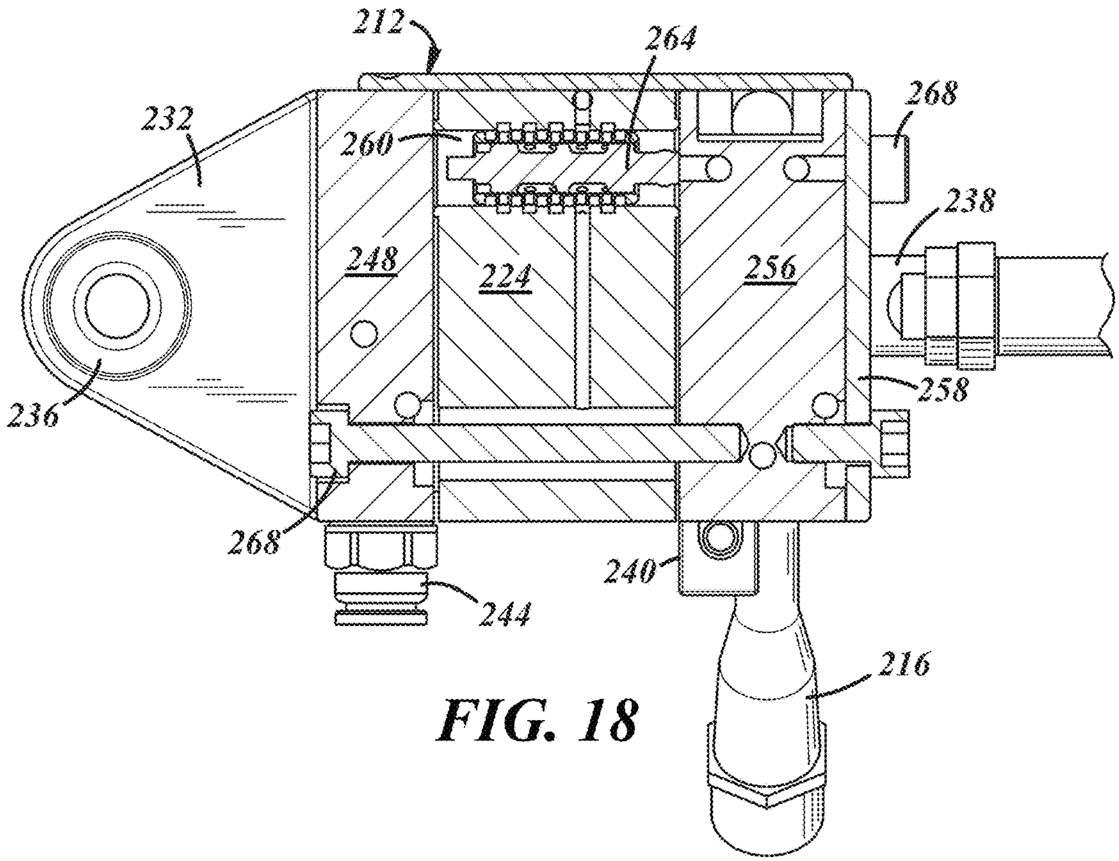
FIG. 18 is a sectional view taken along lines 18-18 shown in FIG. 15.

The air supply i.e. pneumatic pressure is supplied to the control cavity 260 shown in FIGS. 16 and 17 through inlet 244 which leads to supply conduits 294 which leads to legs section 298 that lead to the solenoid valve 240. In addition the supply conduits 296 also lead to supply port 302 to the control cavity 260 to be opened and closed by spools sleeve 264. It is noted that certain sections 306 of the conduits 296 have enlarged diameters to provide greater air supply and to create a buffer in pneumatic pressure fluctuation to the control spool sleeve 264. Also, the conduits 296 connect inlet 244 to inlet 246 so that inlet 246 may serially connect to inlet 244 of another housing 212 similar to that described.

When the solenoid valve 240 mounted on the bottom wall 228 is actuated, it allows pneumatic pressure to pass from conduits 298 to conduit 310 as highlighted in FIGS. 16 and 17. The conduit 310 opens to an end of control cavity 260 to push spool sleeve 264 within its cavity against a spring bias of a spring (not shown) mounted at the other end of the control cavity 260. Plugged legs section 308 are for manufacturing drilling expediency and may be eliminated if other manufacturing techniques are used such as additive manufacturing to produce the housing 212.

When the spool sleeve is moved to a certain position by actuation of the solenoid valve, it opens the communication between the supply conduits 294 as shown in FIGS. 16 and 17 to extension conduit 314 which has a port to the extension port 318 open to section 290 of the actuator cavity 272. Part of the extension conduits have enlarged sections 322 to provide increase pneumatic supply.

When the spool sleeve is moved to its spring bias position, i.e. when the solenoid valve is deactuated, it opens the air supply conduits 294 to retraction conduits 326 which lead to ports 330 open to the section 286 of the actuator cavity 272. The end of control cavity 260 opposite ports pilot conduit port 310 has a respective pilot vent 346 to prevent back pressure on returning spool. Parts of the retraction conduits have enlarged section 334 to provide increased pneumatic supply.

When the spool sleeves shut off communication of the air supply conduit 302 from the extension conduit 314, the spool sleeves open communication of the extension conduits 314 to a vent port 338. Similarly, when the spool sleeve shuts off communication of the air supply conduit 302 from the retraction conduits 326, the spool sleeves open communication of the return conduit 326 to the vents port 342.

In addition, a magnet 348 may be attached to piston 276 that can be sensed by a Hall sensor 352 appropriately placed on the printed circuit board in top cavity 361. The Hall sensor is connected to appropriate wiring passing to communication cables 216.

Other variations and modifications are possible without departing from the scope and spirit of the present invention as defined by the appended claims.

The embodiments in which an exclusive property or privilege is claimed are defined as follows:

1. A pneumatic actuator and control valve assembly characterized by:

a housing having a first control cavity for a control valve and a first actuator cavity for an actuator piston and rod assembly;

said first control cavity and first actuator cavity both being an elongated shape and being substantially parallel to each other;

said first control cavity having a supply port and first and second control valve outlet ports and at least one vent port with said control valve being movable through the first control cavity for controlling communication between the supply port, the first and second outlet ports and the at least one vent port;

said first actuator cavity having first and second ports at respective retracted and extended ends for shuttling the piston and rod assembly within the first actuator cavity between a retracted and an extended end position;

the housing having a first inlet and second inlet for passage of pressurized fluid to and from said housing, said housing having a supply passage from one of said first and second inlets to said first control cavity and a first and second flow path in selective communication to said supply passage for supplying the pressurized fluid from the supply passage to either the first or second ports of the first actuator cavity depending on an actuation state of the control valve for providing reversable movement of said piston and rod assembly between said retracted and extended end position;

said piston and rod assembly including a first piston and a first rod, said first piston is slidably movable within the first actuator cavity to move the first rod between the retracted and the extended end position with respect to the housing based on the actuation state of the control valve providing the pressurized fluid from the supply passage and to one of the first and second flow paths:

said housing having a plurality of flat sides with each side forming an edge with an adjacent side with the edges extending parallel to a longitudinal axis of said housing;

said first actuator cavity extending axially along to be parallel with said longitudinal axis and between said flat sides; and said first control cavity being interposed between said first actuator cavity and one of said edges.

2. A pneumatic actuator and control valve assembly as defined in claim 1 further characterized by;

said plurality of flat sides being four flat sides with each side being perpendicular to an adjacent side and forming said edges as four edges about the periphery of said housing; and said first actuator cavity being substantially round in cross section.

3. A multistage piston and rod assembly characterized by:

a cylinder housing having a first piston receiving section and second piston receiving section;

a first piston having an internal rod for abuttal to a second piston;

said second piston having an externally extending rod extending outside of said cylinder housing;

said cylinder housing having pressure ports for shuttling said pistons within their respective first and second piston receiving sections to provide for a retractable position, an intermediate position and a fully extended position of said externally extending rod;

a plurality of position sensors with at least one of said plurality of position sensors operably connected to each piston and at least three complementary stationary sensors mounted onto the cylinder housing at a retractable position of the first piston, a fully extended position of the first piston and the fully extended position of the externally extending rod such that the retractable, intermediate and fully extended positions of the externally extending rod can be sensed by a position of the position sensors relative to the at least three complementary stationary sensors;

at least one control valve mounted in said cylinder housing for selectively directing fluid to said pressure ports;

said cylinder housing having a first control cavity for the at least one control valve, and a first actuator cavity for the first piston;

said cylinder housing having a plurality of flat sides with each side forming an edge with an adjacent side with the edges extending parallel to a longitudinal axis of said cylinder housing;

said first actuator cavity extending axially along to be parallel with said longitudinal axis and between said flat sides; and said first control cavity being interposed between said first actuator cavity and one of said edges.

4. A multistage piston and rod assembly as defined in claim 3 further comprising:

said at least one control valve being located in said first control cavity which is an elongated cavity in said cylinder housing; and said at least one control valve being at least one spool sleeve.

* * * * *